Figure 1:
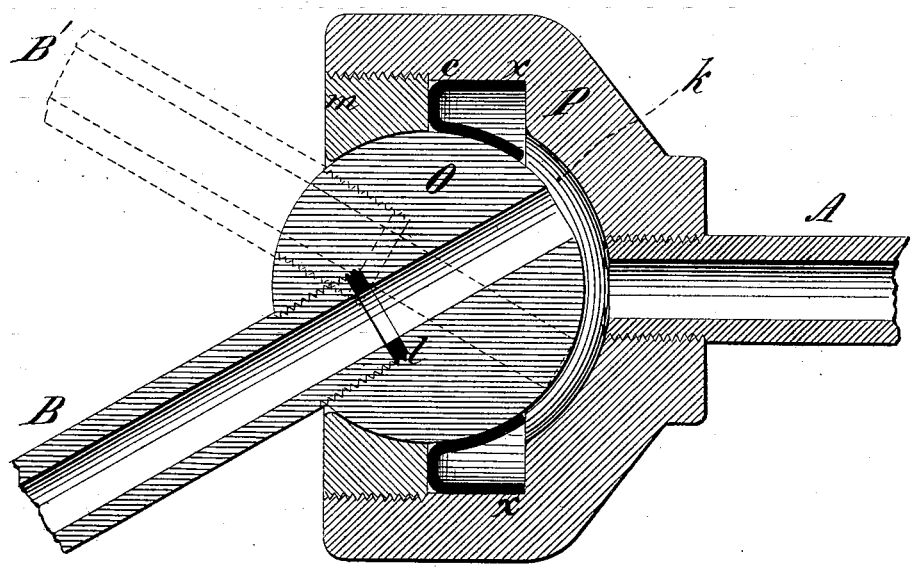

T. F. ROWLAND.
Universal Globe-Valve.

No. 199,936. Patented Feb. 5, 1878.

UNITED STATES PATENT OFFICE.

THOMAS F. ROWLAND, OF NEW YORK, N. Y.

IMPROVEMENT IN UNIVERSAL GLOBE-VALVES.

Specification forming part of Letters Patent No. 199,936, dated February 5, 1878; application filed November 22, 1877.

*To all whom it may concern:*

Be it known that I, THOMAS FITCH ROWLAND, of the city of New York, State of New York, have invented a new and useful Improvement in Universal Globe-Valves, of which the following is a full, true, and exact description, reference being had to the accompanying drawings.

It has been found to be very important in many cases in which power is transmitted, or in which liquids under pressure are transmitted through tubes, to have a joint between the stationary source of the power and the moving tube which carries it on, which joint shall be absolutely tight, while at the same time it can be turned in different directions, so as to allow the fluid under pressure to pass in different directions.

An attempt has before now been made to form such a joint by means of what is known as the universal ball-joint, which consists of a sphere set in a socket, which socket is put in communication with the apparatus supplying the fluid under pressure, while a tube, bored completely through the ball, carries it off in various directions. But it has been found impossible to keep such joints tight, owing to the fact that the sphere rolling within its socket necessarily wears down such socket in such a way that the fluid can escape between the socket and the sphere; and it is to remedy this defect that I have devised my present apparatus.

This apparatus is particularly useful in communicating power from a pump to a moving hydraulic press.

The invention is clearly shown in the figure, which is a cross-section through the center of the apparatus; and it consists in a ball, O, through the center of which there passes a tube, B, which tube is packed in said sphere by means of a rubber packing, c. This sphere O is held in a socket, P, by means of a ring, m, screwed into said socket, which ring has its inner face shaped to correspond with the surface of the sphere.

A tube, A, communicates with the interior of the socket, which should be packed in the same way as the tube B, by means of a packing-ring not here shown.

The socket P is made somewhat larger in diameter than the sphere O, leaving between them a space, k. Inside of the ring m is placed the packing c, which packing consists of an annular cup of leather, or other suitable material, having its back firmly resting against the frame of the socket at the point x, while its other side is pressed firmly against the sphere O by means of the pressure of the water which passes through the tube A into the space k, and then underneath the cup-packing, in such a way as to hold the latter firmly in contact with the sphere O, and prevent any escape of the water between the sphere O and the ring m.

It is obvious from this description that the tube B can be placed in different positions without interfering in any way with this packing. In the drawing, the dotted lines show it at B', elevated by a quarter of a revolution.

The advantages of this U-packing, when combined with this ball-joint, are that it will not wear out readily; but, by means of the pressure of the water behind, it will be constantly held in close contact with the sphere, which is not true of any other form of packing which has been used in connection with these ball-joints.

It is obvious that by means of this arrangement a packing having a spherical surface is formed, which packing is automatically advanced against a rotating or rolling sphere, O, whereby the joint is kept constantly tight, and all wear, either of the packing or of the sphere, is compensated for by this contrivance.

I am aware that U-packing has before now been used in hydraulic presses in which a cylindrical plunger was operated within a cylinder; but the specific combination here shown has never before been used, and possesses many advantages over any previous form of apparatus for this purpose. It has always, so far as I know, been impossible to practically pack one of these universal joints under pressure.

What I claim as my invention, and desire to secure by Letters Patent, is—

1. A spherical surface, O, rolling in contact with a corresponding spherical surface, m, supported in the casing P, which casing is provided with the U-packing c, and held between the sphere O and the casing P, and having its spherical surface in contact with the rolling sphere, substantially as described.

2. The combination of the sphere O, pipe B, passing through said sphere, the spherical U-packing c, chamber k, and inlet-passage A, substantially as described.

THOS. F. ROWLAND.

Witnesses:
E. N. DICKERSON, Jr.,
S. F. SULLIVAN.